United States Patent [19]

Yoshida et al.

[11] Patent Number: 4,590,387
[45] Date of Patent: May 20, 1986

[54] TRANSFER SWITCH

[75] Inventors: Katsuhiro Yoshida, Gifu; Hiroshi Horiguchi, Aichi, both of Japan

[73] Assignee: Aichi Electric Works Co., Ltd., Nagoya, Japan

[21] Appl. No.: 680,491

[22] Filed: Dec. 11, 1984

[30] Foreign Application Priority Data

Sep. 17, 1984 [JP] Japan .................. 59-194317

[51] Int. Cl.⁴ .............................. H02J 9/00
[52] U.S. Cl. .................... 307/64; 200/50 C
[58] Field of Search ............. 307/64, 85, 80, 60, 307/86; 200/17 R, 50 C

[56] References Cited

U.S. PATENT DOCUMENTS 3,647,997 3/1972 Nerem .................. 200/50 C

Primary Examiner—A. D. Pellinen
Assistant Examiner—Morris Ginsburg
Attorney, Agent, or Firm—Holman & Stern

[57] ABSTRACT

This transfer switch has movable contactors moving to connect a load side fixed contactor alternatively to two different current source side fixed contactors. The movable contactors are operatively connected with a control shaft moving along either inclined path of a substantially V-shaped guide groove and the current source selected by the movable contactor is determined by which inclined path of the guide groove the control shaft follows. The inclined path along which the control shaft moves is determined by the direction of the inclination of a point plate closing the inclined path by inclining to either side. The control shaft rises along either of the inclined paths of the guide groove as operatively connected with a rotating motion against a returning spring by a manual or electric operation of an operating lever. When the operating lever is in the original position, the control shaft will be positioned in the middle of the guide groove and the movable contactors will be in neutral positions. The operating lever engages a latch at the end of the rotation. This latch can be manually or electrically disengaged with the operating lever. The point plate is energized by a spring so as to normally incline in one direction. The inclining direction can be reversed manually or electrically.

5 Claims, 19 Drawing Figures

TRANSFER SWITCH

BACKGROUND OF THE INVENTION

This invention relates to a transfer switch for connecting such two different kinds of current sources as a normally used current source and emergency current source or a star connection current source and delta connection current source alternatively to a load side.

There are already suggested various transfer switches. The present invention uses means different from those of any known switches.

SUMMARY OF THE INVENTION

An object of the present invention is to provide a transfer switch whereby two current sources are so interlocked with each other as not to be simultaneously connected to a load side.

Another object of the present invention is to provide a transfer switch whereby both two current sources can be kept off so as not to be connected to a load side.

DETAILED DESCRIPTION OF THE PREFERRED EMBODIMENTS

Figure 1:
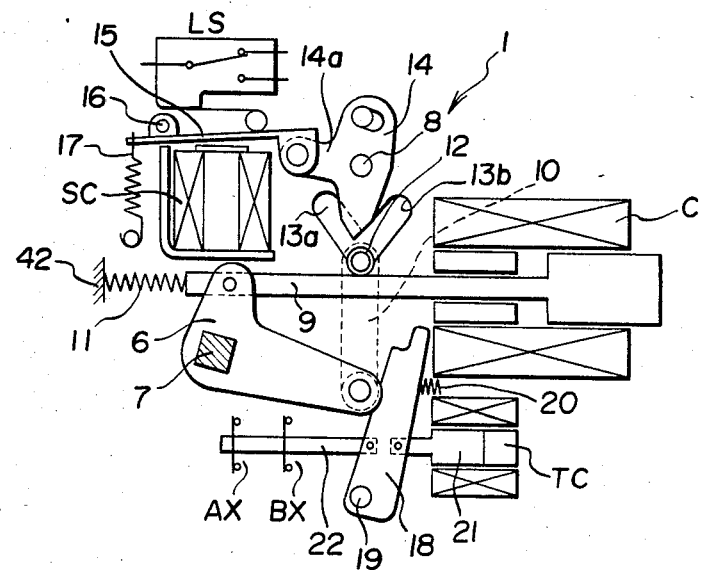
FIGS. 1 to 7 are respectively to explain the operation of the transfer switch of the present invention and therein (A), (B) and (C) are schematic elevations respectively of an operating mechanism, controlling mechanism and charging mechanism.
Figure 1:
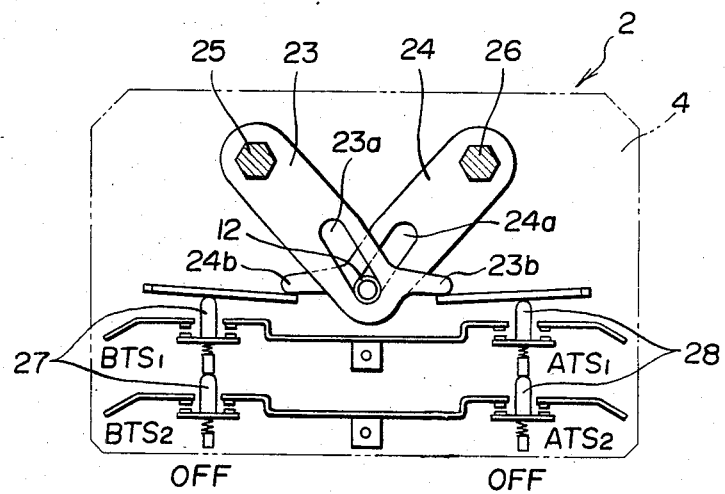
Figure 1:
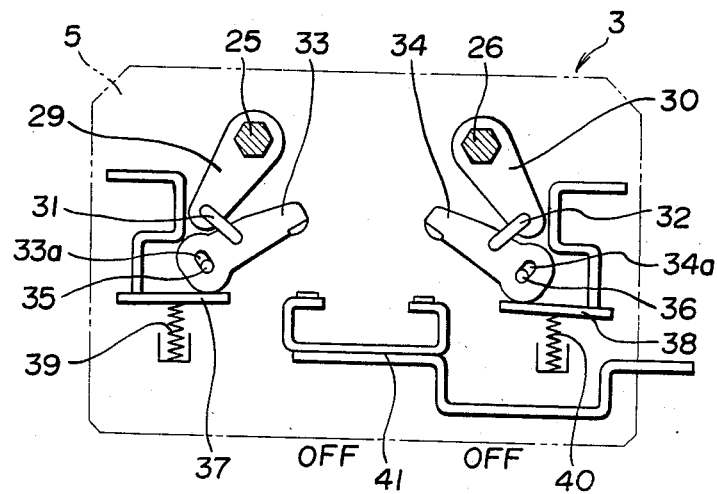
Figure 8:
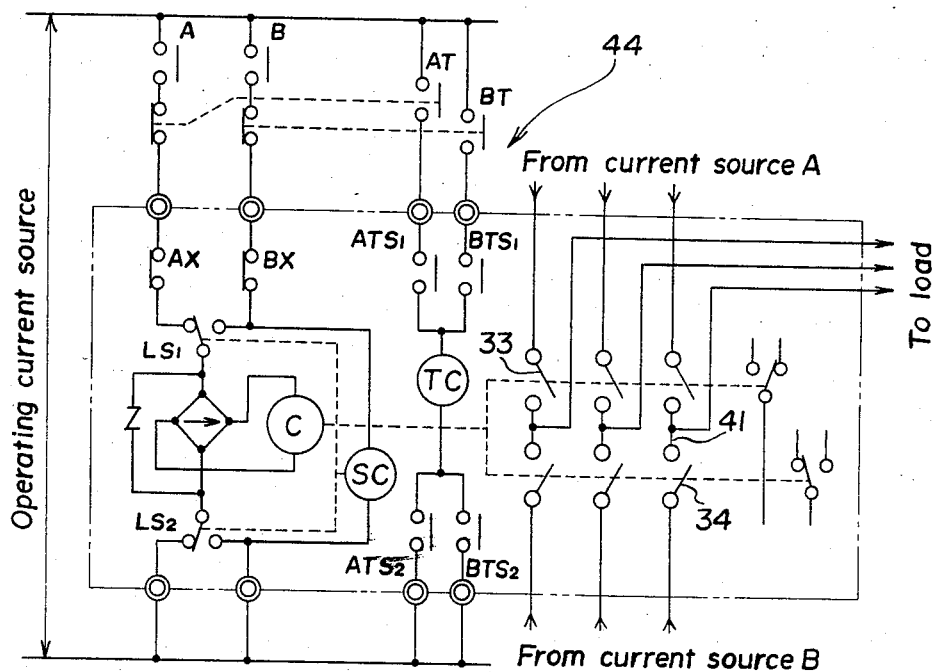
FIG. 8 is a controlling circuit diagram of the transfer switch of the present invention.
Figure 9:
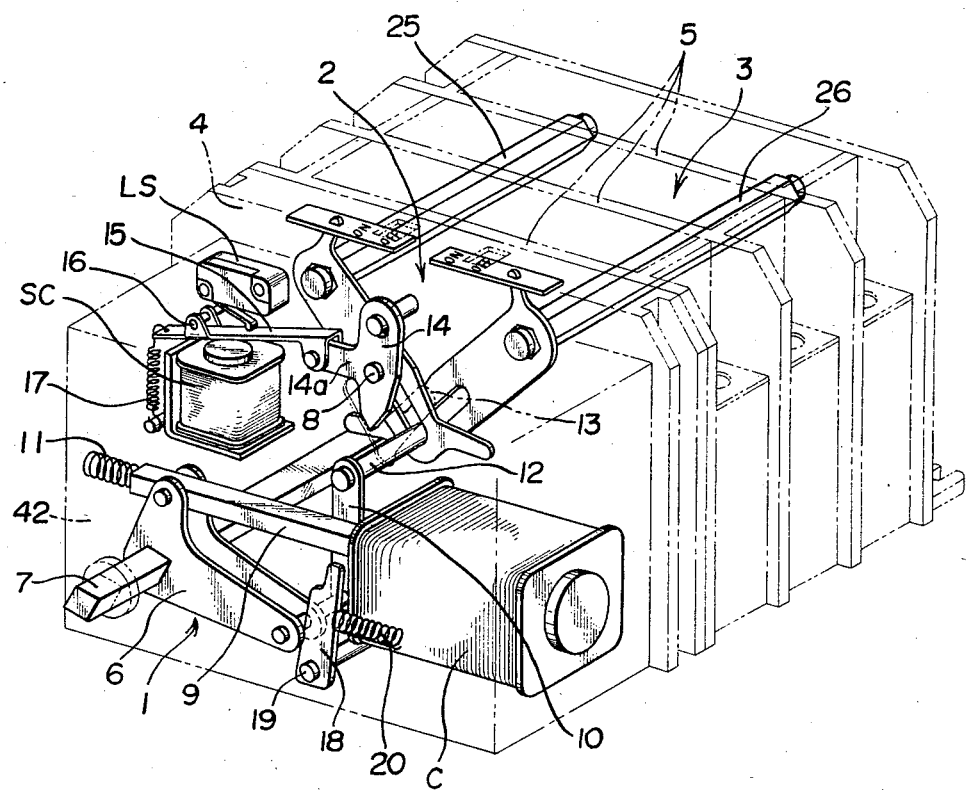
FIG. 9 is a schematic perspective view of the transfer switch of the present invention.

The transfer switch according to the present invention comprises an operating mechanism 1, controlling mechanism 2, charging mechanism 3 and controlling circuit 44 as shown well in FIGS. 1 and 8. The operating mechanism 1, controlling mechanism 2 and charging mechanism 3 are sectioned respectively by partition walls 4 and 5.

As shown in FIG. 1(A), in the operating mechanism 1, a substantially V-shaped operating lever 6 is secured in the intermediate part to an operating shaft 7 provided between the partition wall 4 and a frame 42 and is pivoted at one end to an iron core 9 of a connecting coil C and at the other end to one end of a connecting link 10. A pushing spring 11 is provided between the end of the iron core 9 and the frame 42 so as to be compressed when the iron core 9 is attracted to the connecting coil C and to be returned when the connecting coil C is de-energized to return the iron core 9 and operating lever 6. The controlling shaft 12 is borne at one end with the other end of the connecting link 10. The controlling shaft 12 movably passes through a substantially V-shaped guide groove 13 in the partition wall 4 and projects at the other end into the controlling mechanism part. A point plate 14 as positioned in the upper part of the guide groove 13 is rockably pivoted to the partition wall 4 by a pivot 8. The tip of the point plate 14 projects inside the middle upper part of the guide groove 13 so as to close a right or left inclined path 13b or 13a of the guide groove 13 when inclined to the right or left to prevent the rise of the controlling shaft 12. A rocking lever 15 is pivoted at one end to a sidewise projecting arm 14a of the point plate 14. The rocking lever 15 is intermediately pivoted to the partition wall 4 by a pivot 16 and is locked at the other end to one end of a pulling spring 17. The spring 17 is locked at the other end to the partition wall 4 and is energized to normally pull up the rocking lever 15 at one end and incline the point plate 14 so as to close at the tip one inclined path 13a of the guide groove. A selective coil SC is provided below the rocking lever 15 so that, when excited, it will attract the rocking lever 15, will pull it down on one end side, will incline the point plate 14 in the reverse direction and will close the other inclined path 13b of the guide groove 13. A selective switch LS is provided above the rocking lever 15 so as to sense the rise of the rocking lever 15 on one end side and to switch contacts LS$_1$ and LS$_2$. Positioned below one end side of the operating lever 6, a latch plate 18 is pivoted to the partition wall 4 by a pivot 19. The latch plate 18 ia energized by a pushing spring 20 to rotate to the operating lever 6 side and to be normally in sliding contact on one side with one end of the operating lever 6 so that, when the operating lever 6 rises on one end side, it will engage at the tip with the latch plate 18 so as to be held. An iron core 21 of a trip coil TC is pivoted at one end to one side of the intermediate part of the latch plate 18 so that, when the trip coil TC is excited, the latch plate 18 and operating lever 6 will be disengaged with each other. The latch plate 18 can be also manually disengaged with the operating lever 6. A movable contactor 22 of control switches AX and BX is pivoted to the other side of the intermediate part of the latch plate 18.

As shown in FIG. 1(B), in the controlling mechanism 2, a current source A side control lever 23 and current source B side control lever 24 are positioned as opposed at the respective ends to each other on both upper sides of the guide groove 13 and are rotatably pivoted to the partition wall 4 respectively by rotary shafts 25 and 26. Both control levers 23 and 24 rotatably overlap on each other at the other side ends and respectively have slots 23a and 24a. The control shaft 12 is slidably inserted in the position in which the slots 23a and 24a overlap on each other so that both control levers 23 and 24 will be alternatively rotatable with the movement of the control shaft 12. Further, both control levers 23 and 24 are provided at the other ends respectively with pressing projections 23b and 24b so that, when the pressing projection 24b or 23b is in the lower position, the movable contactor 27 or 28 respectively of the current source B side trip control switches BTS$_1$ and BTS$_2$ or the current source A side trip control switches ATS$_1$ and ATS$_2$ will be pushed down to open the respective contacts.

In the charging mechanism 3, rotary arms 29 and 30 are secured at the ends respectively to the rotary shafts 25 and 26 provided between the partition walls 4 and 5 and are connected at the other ends respectively with the intermediate parts of the movable contactors 33 and 34 through U-shaped connecting pins 31 and 32. The movable contactors 33 and 34 have slots 33a and 34a respectively on the end sides and are pivotally borne in the partition wall 5 respectively by pivots 35 and 36 inserted through these slots. That is to say, the respective movable contactors 33 and 34 alternatively rise and fall through such pair of power transmitting means to be operatively connected to the control shaft 12 as the control levers 23 and 24, rotary shafts 25 and 26, rotary arms 29 and 30 and connecting pins 31 and 32. Fixed contactors 37 and 38 respectively on the sides of the first current source A and second current source B are normally pressed respectively by springs 39 and 40 into contact respectively with the lower parts of the ends of the movable contactors 33 and 34. A fixed contactor 41 on the load side is provided in the intermediate part between the movable contactors 33 and 34 opposed to each other so that, when the movable contacts 33 and 34 fall, they will be able to contact at the tips with the fixed contactor 41. When the movable contactors 33 and 34 fall, they will be pushed up at the ends on the pivoting sides respectively by the contactors 37 and 38 and will be pressed on the tip sides into contact with the load side fixed contactor 41 respectively by lever actions with the intermediate connecting pin pivotally bearing parts as fulcra.

The control circuit diagram in FIG. 8 and the operation of its switches shall be explained. In FIGS. 1(A), (B) and (C), the control shaft 12 is positioned in the middle of the guide groove 13 and the movable contactors 33 and 34 are in the neutral positions and are not in contact with the fixed contactor 41 on the load side. At this time, as in FIG. 8, the contacts LS$_1$ and LS$_2$ of the selective switch LS have closed on the A side, the control switches AX and BX have closed and the trip control switches ATS$_1$, ATS$_2$, BTS$_1$ and BTS$_2$ are all open.

When the current source A side connecting switch A is closed from the state in FIG. 1, the circuit will be closed through the control switch AX, selective switch contact LS$_1$, connecting coil C and selective switch contact LS$_2$ and the connecting coil C will be excited. As in FIG. 2, by the excitation of the connecting coil C, the iron core 9 will be attracted, the spring 11 will be compressed and the operating lever 6 will be rotated counterclockwise at one end. Thereby, the control shaft 12 will be pushed up but, as one inclined path 13a of the guide groove is closed by the point plate 14, the control shaft 12 will rise along the other inclined path 13b. With the rise of the control shaft 12, the current source A side control lever 23 will rotate, the current source A side trip control switches ATS$_1$ and ATS$_2$ will close and, at the same time, the rotary shaft 25 and rotary arm 29 will rotate counterclockwise to make the movable contactor 33 fall and to connect the current source A side fixed contactor 37 and the load side fixed contactor 41 with each other. In the position where the connecting operation has been completed, the latch 18 will be engaged with the operating lever 6 and therefore the operating lever 6 will be held. By the way, the operating shaft 7 may be manually rotated instead of the electric operation by the connecting coil C to obtain the same operation.

Figure 2:
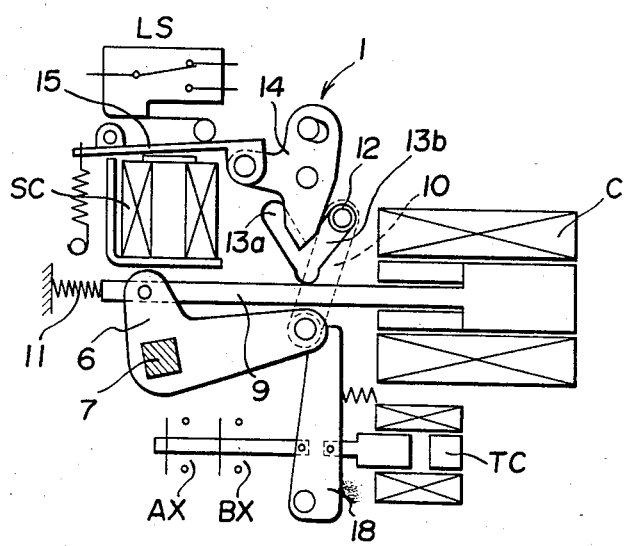
Figure 2:
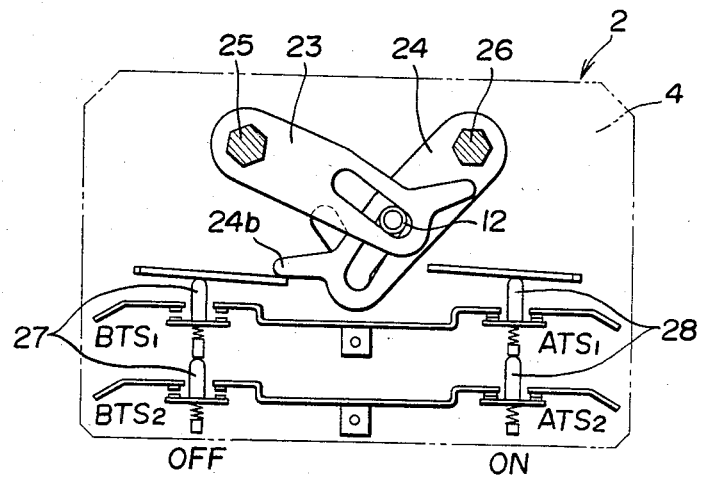
Figure 2:
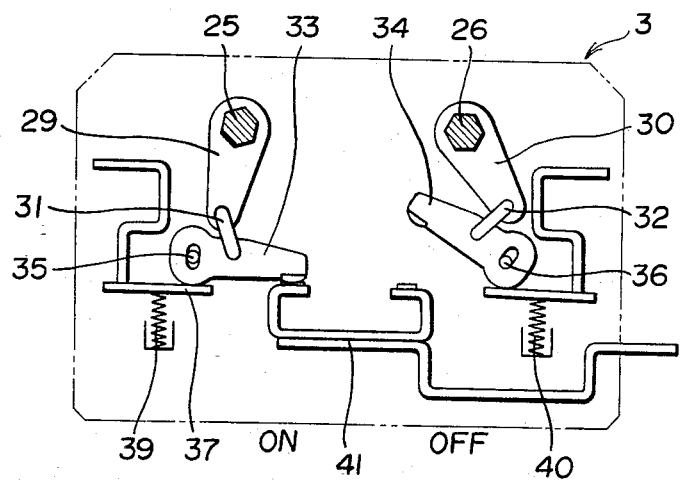

When the current source A side trip switch AT is closed from the state in FIG. 2, in FIG. 8, the circuit will be closed through the trip switch AT, trip control switch ATS$_1$, trip coil TC and trip control switch ATS$_2$ to excite the trip coil TC. As in FIG. 3, when the trip coil TC is excited, its iron core 21 will be attracted, the latch 18 will be disengaged with the operating lever 6 and the operating lever 6 will be released and will be rotated clockwise by the accumulated energy of the spring 11 to return to the original state. Thereby the control switches AX and BX will be closed. The control shaft 12 will be pulled down, the current source A side control lever 23 will be rotated clockwise to return to the original state, the current source A side trip control switches ATS$_1$ and ATS$_2$ will be opened and the rotary arm 29 will be also rotated clockwise to return to the original state and the movable contactor 33 will be erected to cut off the current source A. The latch 18 may be manually operated instead of the electric operation by the trip coil TC to release the operating lever 6 to obtain the same interrupting operation.

Figure 3:
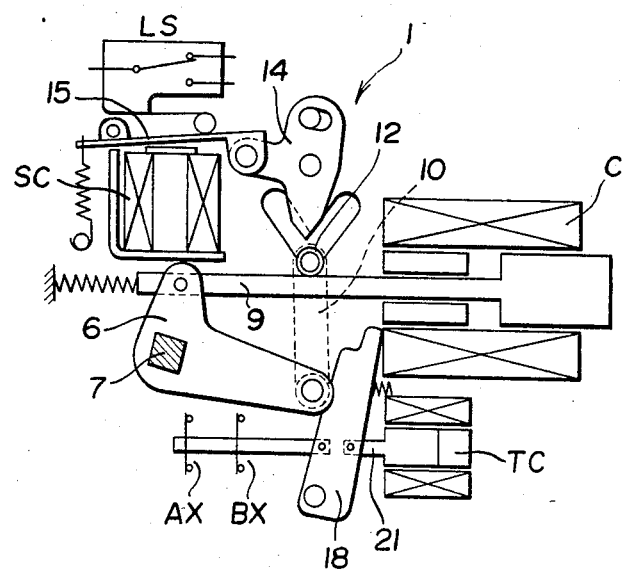
Figure 3:
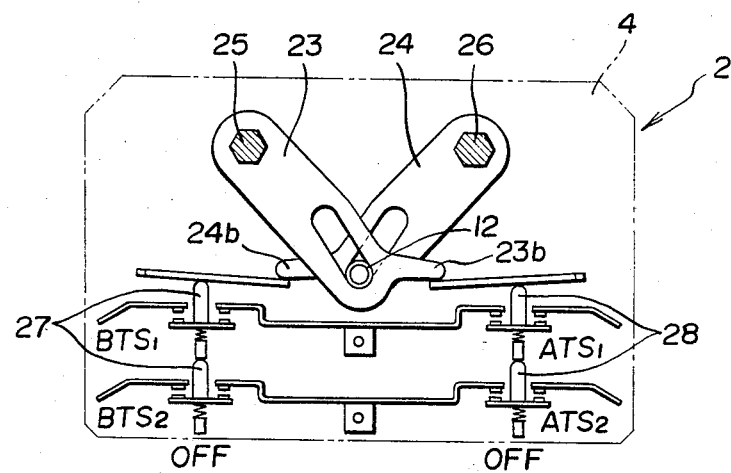
Figure 3:
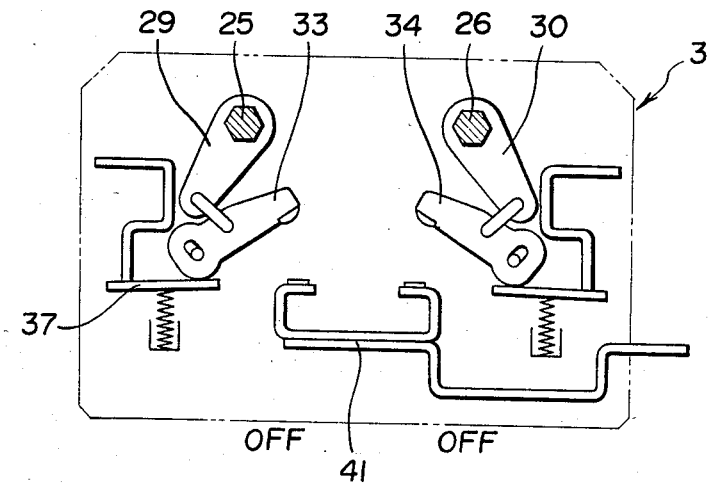
Figure 4:
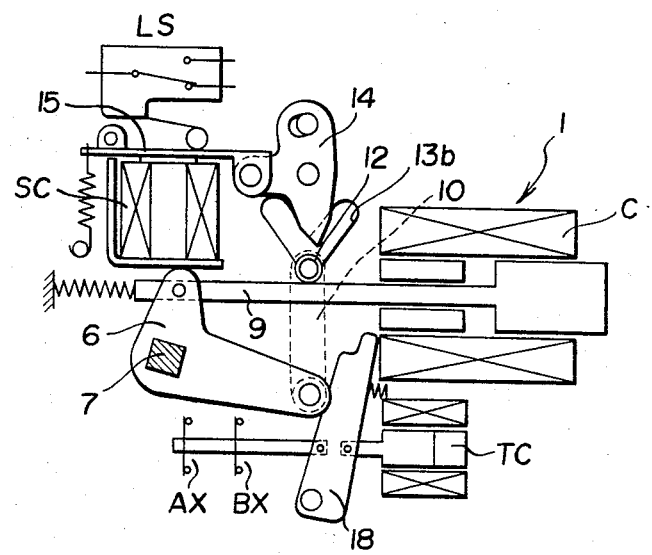
Figure 5:
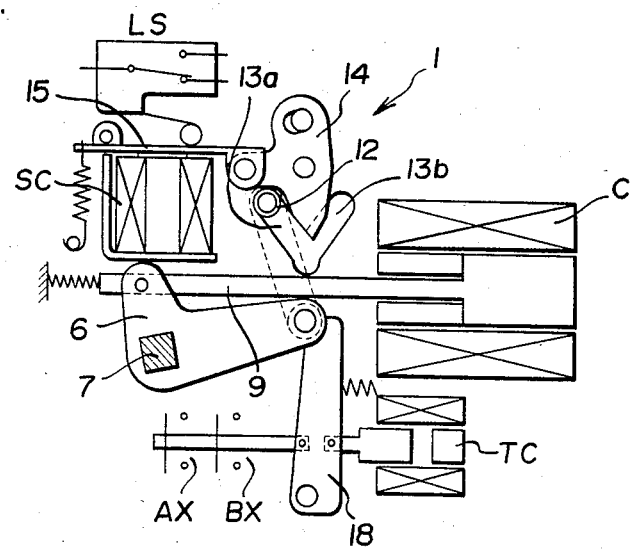
Figure 5:
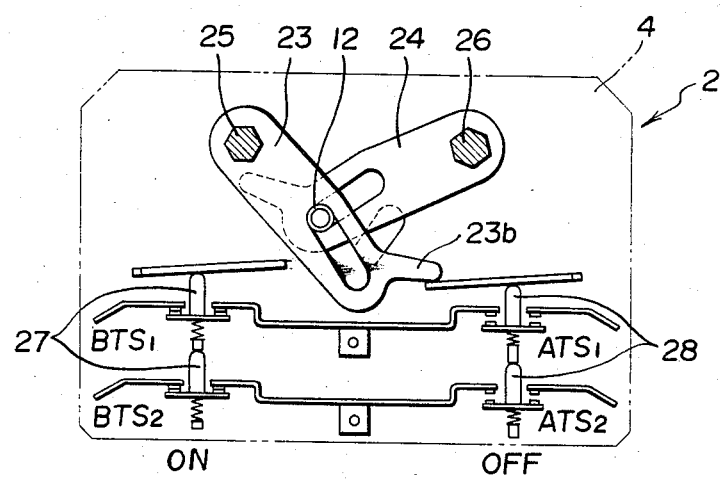
Figure 5:
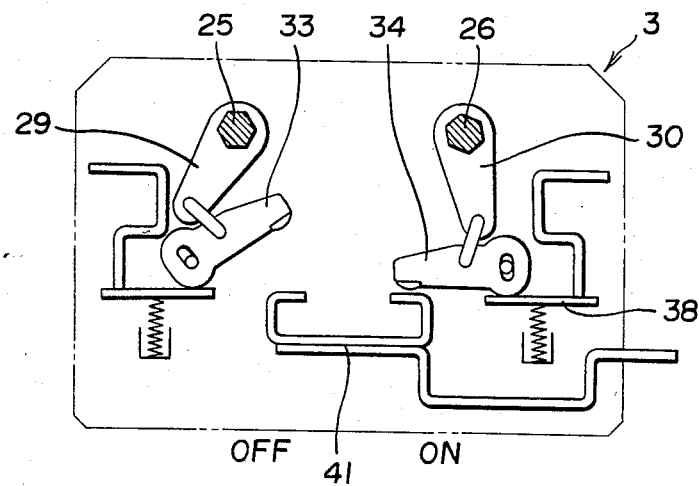

Now, in the case of connection to the current source B side from the state in FIG. 3, in FIG. 8, when the current source B side connecting switch B is closed, the circuit will be closed through the connecting switch B, control switch BX and selective coil SC. Then, as in FIG. 4, the rocking lever 15 will be attracted by the selective coil SC to rock clockwise, the contacts LS$_1$ and LS$_2$ of the selective switch LS will be switched over to the B side, the point plate 14 will rock counterclockwise and will close at the tip the other inclined path 13b of the guide groove 13. At the same time, in FIG. 8, the circuit will be closed through the connecting switch B, control switch BX, selective switch contact LS$_1$, connecting coil C and selective switch contact LS$_2$ to excite the connecting coil C. Then, as shown in FIG. 5, the iron core 9 will be attracted and the control shaft 12 will be pushed up but, as one inclined path 13b of the guide groove 13 is closed by the point plate 14, the control shaft 12 will rise along the other inclined path 13a. Then, as in FIG. 5(B), the current source B side control lever 24 will be rotated clockwise, the current source B side trip control switches BTS$_1$ and BTS$_2$ will be closed. As in FIG. 5(C), the movable contactor 34 will be made to fall to connect the current source side fixed contactor 38 and load side fixed contactor 41 with each other. When the current source B side connecting operation in completed, as in FIG. 6, the latch 18 will hold the operating lever 6 and the control switches AX and BX will open. Therefore, in FIG. 8, the selective coil SC will be de-energized and over 15 will be rotated counterclockwise by the accumulated energy of the spring 17 so as to return to the original state, the point plate 14 will be rotated clockwise to again close one inclined path 13a of the guide groove 13. At the same time, the contacts LS$_1$ and LS$_2$ of the selective switch LS will be switched over to the A side. In case the connection to the current source B side is to be made manually, the rocking lever 15 may be pushed down from outside to close the inclined path 13b of the guide groove 13 with the point plate 14 and the operating shaft 7 may be rotated.

Figure 6:
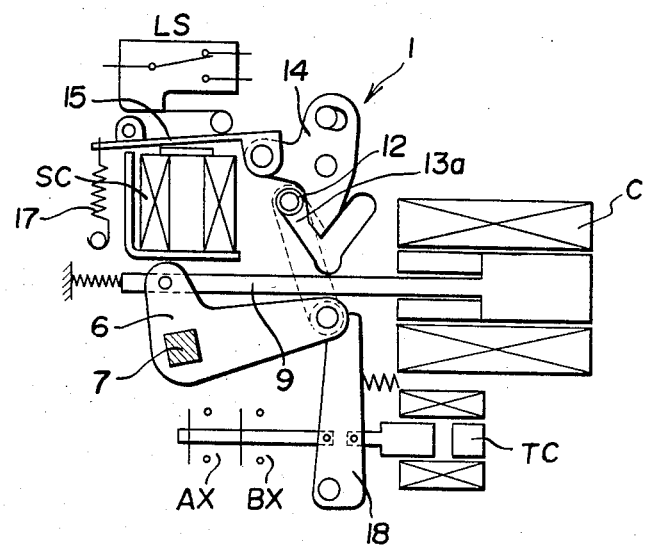
Figure 7:
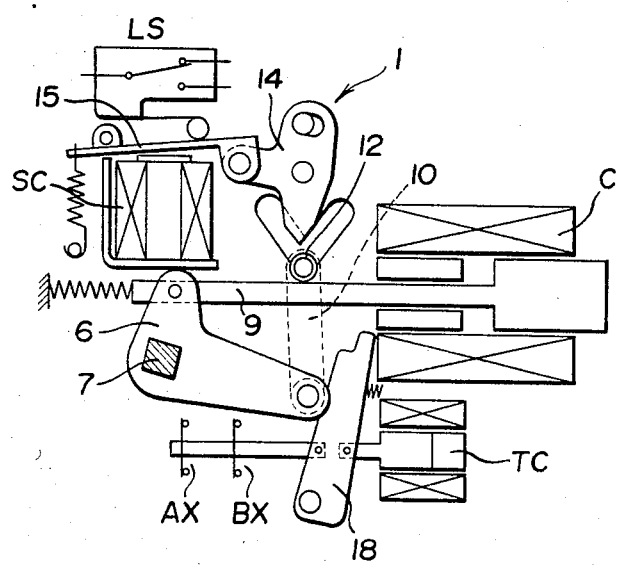
Figure 7:
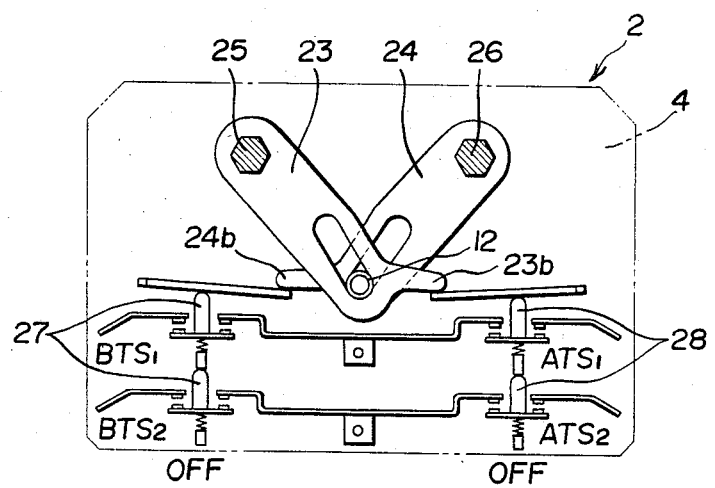
Figure 7C:
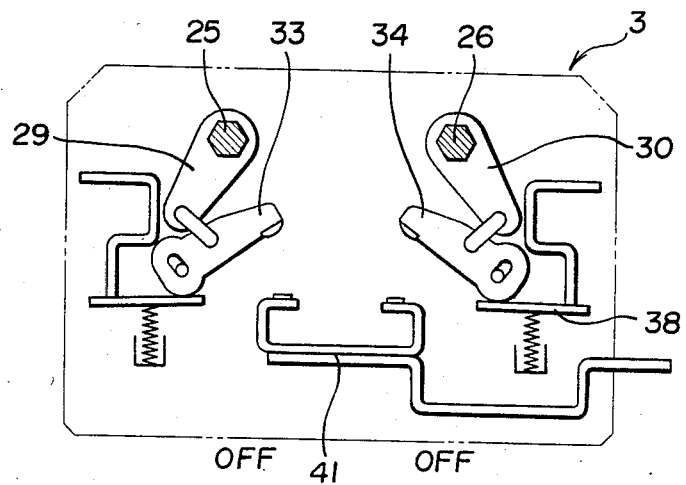

When the current source B side trip switch BT is closed from the state in FIG. 6, in FIG. 8, the circuit will be closed through the trip switch BT, trip control switch BTS$_1$, trip coil TC and trip control switch BTS$_2$ to excite the trip coil TC. Then, as in FIG. 7(A), the latch 18 will disengage and the operating lever 6 will return, as in FIG. 7(B), the current source B side control lever 24 will rotate to return and, as in FIG. 7(C), the movable contactor 34 will rise to cut off the current source B.

As explained above, the present invention comprises an operating lever 6 rotated by a manual or electric operation and free to be returned by a spring 11, a control shaft 12 movable up and down along two inclined paths 13a and 13b of a substantially V-shaped guide groove 13 with the rotation of this operating lever 6 and positioned in the middle of the guide groove 13 in the position of the returned operating lever 6, movable contactors 33 and 34 operatively connected with this control shaft 12, connecting respectively first and second current source side fixed contactors 37 and 38 with a load side fixed contactor 41 when the control shaft 12 is at the upper ends of the two inclined paths 13a and 13b and located in neutral positions when the control shaft is in the middle position of the guide groove, a point plate 14 projected at the tip inside the guide groove, manually or electrically rockable so as to alternatively close the two inclined paths for the control shaft 12 in the guide groove 13 and normally energized by a spring force so as to close one 13a of the inclined paths of the guide groove 13 and a latch 18 energized to be normally in sliding contact with the operating lever 6 engaged with this operating lever 6 near the rotation end of the operating lever, preventing the return of said operating lever and capable of manually or electrically disengaging the operating lever. Therefore, depending on the position of the point plate, any current source side fixed contactor 37 or 38 can be contacted with the load side fixed contactor 41. Thus, after one current source is cut off, the same current source side can be again continuously connected. Therefore, the present invention can be utilized as a switch for switching not only an emergency current source and normally used current source but also a star connection current source and delta connection current source. Further, when it is connected to either current source, the latch 18 will engage the operating lever 6, therefore the other current source side will not be able to be simultaneously connected and the current sources will be prevented from being mixedly contacted. If the latch 18 is disengaged to release the operating lever 6, the movable contactors 33 and 34 will be placed in neutral positions to cut off both current sources.

We claim:
1. A transfer switching apparatus comprising:
an operating lever, a control circuit for moving the operating lever from a rest position to a switching position, a spring for returning the operating lever to the rest position;
a control shaft movable up and down along two inclined paths of a substantially V-shaped guide groove with the rotation of the operating lever and positioned in the middle of the guide groove when the operating lever is in the rest position;
movable contactors operatively connected with the control shaft, connecting respectively first and second current source side fixed contactors with a load side fixed contactor when the control shaft is at the upper ends of the two inclined paths and located in neutral positions when the control shaft is in a middle position of the guide groove;
a point plate having a tip positioned inside the guide groove, manually or electrically rockable so as to alternatively close the two inclined paths for the control shaft in the guide groove and normally energized by a spring force so as to close one of the inclined paths of the guide groove and
a latch energized to be normally in sliding contact with the operating lever engaged with the operating lever near the rotation end of the operating lever, preventing the return of said operating lever and capable of disengaging the operating lever.

2. Apparatus according to claim 1 wherein said movable contactors are provided in a pair to electrically connect and disconnect the respective first and second current source side fixed contactors with the load side fixed contactor and said movable contactors are moved as connected respectively with respective power transmitting elements which are to be alternatively operatively connected with the control shaft depending on which of the inclined paths of said guide groove said control shaft follows.

3. Apparatus according to claim 2 wherein said power transmitting elements comprise respective control levers engaged with said control shaft to rotate as alternatively operatively connected with the control shaft depending on which of the inclined paths of said guide groove said control shaft follows, rotary shafts to which said control levers are respectively secured at their ends and rotating arms secured at the ends respectively to said rotary shafts to raise and lower said respective movable contactors together with said rotary shafts.

4. Apparatus according to claim 3 wherein said control levers have opposite ends with respective slots and the levers overlap each other to make the slots intersect with each other and have said control shaft passed through an intersecting part of said slots and rotate alternatively as operatively connected with the control shaft depending on which of the inclined paths of said guide groove said control shaft follows and transmit the movement of the control shaft to said respective movable contactors.

5. Apparatus according to claim 1 wherein said operating lever is connected with the control shaft through a link so that the connecting link will be rocked by the rotation of the operating lever to alternatively move the control shaft along either inclined path of said guide groove.

* * * * *